Jan. 26, 1960   A. C. HOLLERBACH   2,922,674
ARM REST ASSEMBLY
Filed Dec. 12, 1956
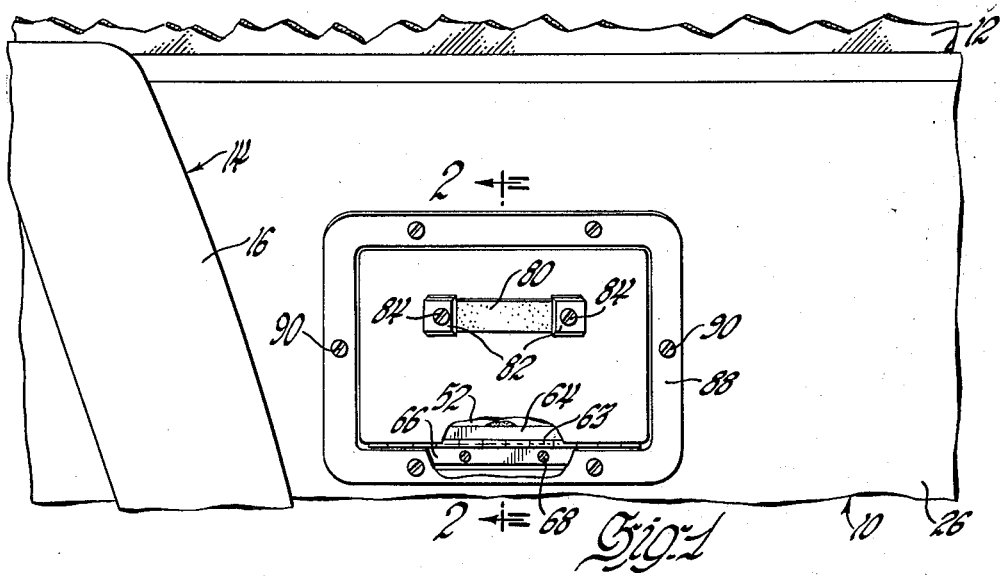
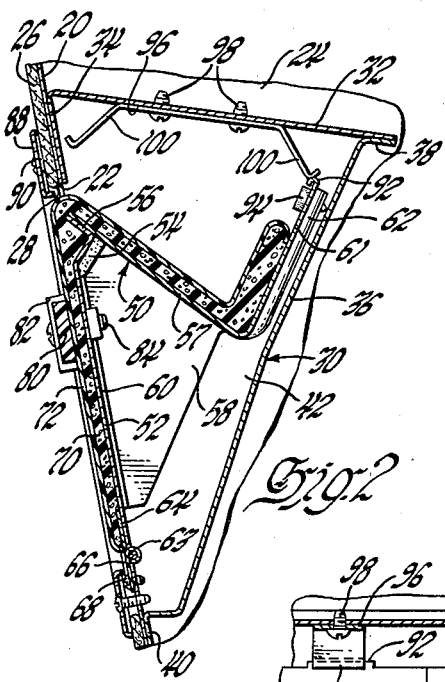
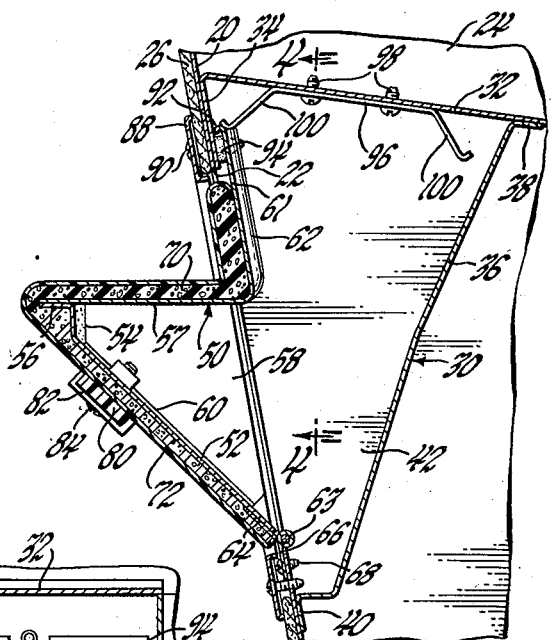
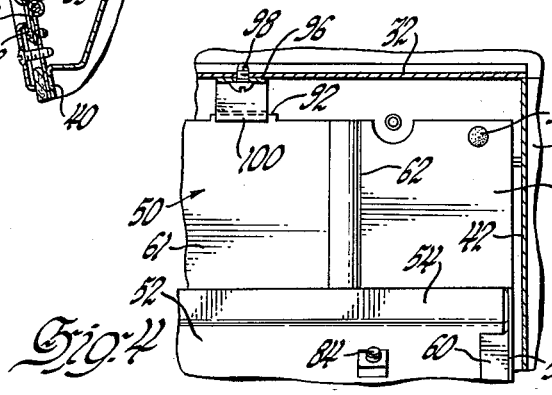
INVENTOR.
Aloys Charles Hollerbach
BY
W. S. Pettigrew
ATTORNEY

United States Patent Office 2,922,674
Patented Jan. 26, 1960

2,922,674

ARM REST ASSEMBLY

Aloys Charles Hollerbach, Grosse Pointe Park, Mich., assignor to General Motors Corporation, Detroit, Mich., a corporation of Delaware Application December 12, 1956, Serial No. 627,792

1 Claim. (Cl. 296—44)

This invention relates to arm rest assemblies for vehicle bodies and more particularly to arm rest assemblies for vehicle bodies which are movable to an out-of-the-way position when not in use.

The arm rest assembly of this invention generally includes an arm support portion and arm rest portions extending laterally from opposite sides thereof to provide a unitary assembly. The assembly is swingably mounted on a body panel adjacent one edge of an opening therein and is movable between an out-of-the-way position wherein one of the arm rest portions fits flush with the panel and closes the opening therein and an operative position wherein the arm support portion and the one portion project outwardly of the panel with the other portion being disposed within the opening and flush with the panel to close the portion of the opening left vacant when the one portion is moved outwardly of the opening.

By providing such an arm rest assembly, the assembly need not project into the passenger compartment of the body when not in use so as to create a hindrance to the passenger. In addition, the seat backs of many vehicle bodies are tiltable forwardly of the seat bottoms to provide for increased entrance and exit room. In many such bodies, the seat backs may not be tilted forwardly when the doors are closed due to interference between the seat backs and the door arm rests. By providing the door with an arm rest which may be moved to an out-of-the-way position the seat backs of such bodies may be tilted forwardly regardless of whether the door is opened or closed.

The primary object of this invention is to provide an improved arm rest assembly for vehicle bodies. Another object of this invention is to provide an arm rest assembly for vehicle bodies which may be moved to an out-of-the-way position when not in use. A further object of this invention is to provide an arm rest assembly for vehicle bodies which is movable inwardly and outwardly with respect to an opening in a body panel and which conceals the opening in either position thereof.

These and other objects of this invention will be readily apparent from the following specification and drawing, in which:

Figure 1 is a partial side elevational view of a vehicle body having an arm rest assembly according to this invention mounted therein on one of the door panels, with the arm rest assembly being shown in an out-of-the-way position;

Figure 2 is a sectional view taken on the plane indicated by line 2—2 of Figure 1;

Figure 3 is a view similar to Figure 2 and showing the arm rest assembly in an operative position; and Figure 4 is a partial view taken on the plane indicated by line 4—4 of Figure 3.

Referring now to Figure 1 of the drawing, a vehicle body includes a door 10 which is swingable between open and closed positions as is well known to provide entrance and exit to and from the body, and a window 12 which is supported by the door for movement between open and closed positions. A seat 14 is mounted within the body and includes a seat back 16 which may be mounted on a seat bottom, not shown, disposed to the right thereof for swinging movement in a clockwise direction between an upright position, as shown, and a tilted position wherein the seat back is disposed over the seat bottom to provide increased entrance and exit room to and from the rear of the seat when the door 10 is in open position.

Referring now particularly to Figures 2 and 4 of the drawing, the door 10 includes a door inner panel 20 which is provided with a rectangularly shaped opening 22 affording access to the door well 24 which is defined by the inner and outer panels of the door. A trim pad 26 covers the door inner panel 20 and is provided with an opening 28 substantially coextensive with the opening 22.

An arm rest housing 30 includes an upper plate member 32 having an outer flanged edge 34 which is spot welded or otherwise secured to the inner surface of door panel 20 adjacent the upper edge of opening 22, and a housing 36 having an upper flanged edge 38 spot welded or otherwise secured to plate 30 adjacent the inner edge thereof and a lower flanged edge 40 which is spot welded or otherwise secured to the door inner panel 20 adjacent the lower edge of the opening 22 therein. In addition, the housing includes side walls 42 provided with flanged edges 44 which may be spot welded or otherwise secured to the door panel 20 adjacent opposite side edges of the opening 22.

A unitary arm rest assembly includes an angular upper plate 50 and a lower plate 52 having an offset portion 54 adjacent the upper edge thereof which terminates in a flange 56 spot welded or otherwise secured to leg 57 of plate 50 adjacent the outer edge thereof. Plate 50 further includes laterally extending end plates 58 at either side edge thereof having flanges 60 which are welded or otherwise secured to plate 52. The leg 61 of plate 50 is ribbed at 62 in one or more places for strengthening. A piano type hinge 63 has one leaf 64 thereof spot welded or otherwise secured to the outer surface of plate 52 adjacent the lower edge thereof and the other leaf 66 thereof secured by bolts 68 to the door inner panel 20 adjacent the lower edge of the opening 22 therein. Plates 50 and 52 and end plates 58 of plate 50 are covered with a resilient material 70 such as foam rubber. It will be noted that the material 70 does not extend to the upper edge of leg 61 of plate 50 but terminates short of this edge. A decorative fabric covering 72 is applied over the resilient material 70 and is secured thereto by a suitable manner such as by cement.

A pull handle 80 has opposite ends thereof received within escutcheon members 82 which are secured to plate 52 by bolts 84 so as to mount the handle on the arm rest assembly. A rectangularly shaped escutcheon member 88 extending around the openings 22 and 28 and over the hinge leaf 66 is secured to the door inner panel 20 by a number of screws 90.

A rolled over tab 92 is provided at the upper edge of leg 61 of plate 50 intermediate the ends thereof, and a rubber bumper 94 is secured to the leg adjacent each side edge thereof. A flat spring 96 secured to plate 32 by bolts 98 has oppositely extending legs 100 which cooperate with tab 92 in holding the arm rest assembly in either its operative or out-of-the-way position as will be described.

Referring now particularly to Figures 2 and 3 of the drawing, the arm rest assembly may be moved between an out-of-the-way position as shown in Figure 2, and an operative position, as shown in Figure 3, about the hinge 63, and it will be noted that the assembly closes the openings 22 and 28 in either position thereof. When the arm rest assembly is in an out-of-the-way position, as shown in Figure 2, the plate 52 fits within the openings 22 and 28 substantially flush with the trim pad 26 and is substantially coextensive with these openings so that the plate will close the openings and conceal the remainder of the arm rest assembly. If desired, the fabric 72 may have the same or similar appearance to the trim pad 26 to further blend with the inner surface of the door. When the arm rest assembly is in this position, the tab 92 on the leg 61 of plate 50 engages the inner leg 100 of spring 96 to releasably hold the arm rest assembly in this position without rattling or movement thereof.

When it is desired to move the arm rest assembly to an operative position as shown in Figure 3, the handle 80 is grasped and the arm rest assembly is pulled outwardly about hinge 63 to release the tab 92 from engagement with the inner leg 100 of spring 96 and to move the tab into engagement with the outer leg 100 of the spring as the rubber bumpers 94 engage the flange 34 of plate 32 to provide a resilient stop and to also cooperate with the outer leg of the spring 96 and tab 92 in releasably holding the assembly in this position without rattling or movement thereof. When the assembly is in this position, the leg 57 of plate 50 extends substantially normal to the door inner panel to provide an arm support while the upper leg 61 of plate 50 extends from this leg to adjacent the upper edge and a portion of each of the side edges of the openings 22 and 28 to close the portion of the openings left vacant when plate 52 is moved outwardly thereof. The end plates 58 of plate 50 extend outwardly of the opening on either side of the assembly so as to close the sides thereof. The assembly may be easily moved to an out-of-the-way position as shown in Figure 2 by grasping handle 80 and pushing the assembly inwardly of openings 22 and 28 until tab 92 engages the inner leg 100 of spring 96.

The clearance between the seat back 16 and door 10 is such that the seat back may not be tilted forwardly and backwardly when the door is closed without interference with the arm rest assembly if the assembly is in operative position. However, when the arm rest assembly is in its position of Figure 2, the seat back 16 may be tilted forwardly and backwardly without any interference whatsoever between the seat back and arm rest. Thus, the door 10 may be moved to open and closed positions even if the seat back remains in its forwardly tilted position since the seat back will not interfere with the arm rest assembly.

Thus, this invention provides an arm rest assembly for vehicle bodies which is movable within an opening in a body panel between an out-of-the-way position when not in use wherein the assembly fits within the panel and conceals the opening, and an operative position wherein the assembly extends outwardly of the panel to provide an arm support for a vehicle passenger and again conceals the opening. By having the arm rest assembly conceal the opening in either position thereof, the assembly adds to the interior appearance of the body and yet provides a useful and operative structure.

What is claimed is:

The combination comprising, a vehicle body panel having an opening therein, an arm rest assembly including, support means, said support means including a pair of angularly disposed face plate members joined at the adjacent upper edge of one member and outer edge of the other member, a pair of side plate members, each being located at one side of said face plate members and being joined to the side edges of said face plate members, said one face plate member being generally coextensive with said opening and said other face plate member providing an arm support for a vehicle body passenger, an upper plate member extending upwardly from the inner edge of said other face plate member, a resilient covering for said support means extending over said face plate members and said side plate members thereof and partially over said upper plate member, and hinge means interconnecting said panel adjacent the lower edge of said opening and the lower edge of said one face plate member for swingably mounting said support means on said panel, said support means being swingable between a first non-operating position wherein said one face plate member is located within the opening of said panel with said other face plate member and said upper and side plate members extending inwardly of said opening, and a second operating position wherein said one face plate member extends angularly outwardly from the lower edge of said opening with said other face plate member being disposed in a generally horizontal position between the upper edge of said one face plate member and said opening with said side plate members being disposed outwardly of said opening between the side edges thereof and the side edges of said face plate members and said upper plate member being disposed between the inner edge of said other plate member and said panel adjacent the upper edge of said opening, with said resilient covering on said upper plate member being disposed within said opening between said upper edge thereof and said inner edge of said other face plate member.

References Cited in the file of this patent

UNITED STATES PATENTS

| | | |
|---|---|---|
| 1,835,947 | Johannsen | Dec. 8, 1931 |
| 1,873,414 | Jarvis | Aug. 23, 1932 |
| 1,894,621 | Lehman | Jan. 17, 1933 |
| 1,902,730 | Shaw | Mar. 21, 1933 |
| 2,088,709 | Lejuste | Aug. 3, 1937 |
| 2,159,062 | Visser | May 23, 1939 |
| 2,174,244 | Jacobs | Sept. 26, 1939 |
| 2,642,926 | Diamond | June 23, 1953 |
| 2,794,671 | Clark | June 4, 1957 |

FOREIGN PATENTS

| | | |
|---|---|---|
| 325,807 | Italy | Apr. 10, 1935 |